(12) United States Patent
Fujiu et al.

(10) Patent No.: US 9,061,585 B2
(45) Date of Patent: Jun. 23, 2015

(54) COOLING AIR INTRODUCTION APPARATUS FOR VEHICLE

(75) Inventors: Yuji Fujiu, Tokyo (JP); Yoshiyuki Shimizu, Tokyo (JP); Atsushi Koizumi, Tokyo (JP); Shiro Hasegawa, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 89 days.

(21) Appl. No.: 13/424,700

(22) Filed: Mar. 20, 2012

(65) Prior Publication Data
US 2012/0248824 A1  Oct. 4, 2012

(30) Foreign Application Priority Data

Mar. 31, 2011  (JP) ................................. 2011-078292
Mar. 31, 2011  (JP) ................................. 2011-078293

(51) Int. Cl.
*B60K 11/08*  (2006.01)

(52) U.S. Cl.
CPC ....................................... *B60K 11/08* (2013.01)

(58) Field of Classification Search
USPC ................... 180/68.1, 68.2, 68.3, 68.4, 68.6; 296/193.09, 193.1
See application file for complete search history.

(56) References Cited

U.S. PATENT DOCUMENTS

| | | | | |
|---|---|---|---|---|
| 4,141,426 A * | 2/1979 | Hamada et al. | ............. | 180/68.4 |
| 4,169,501 A * | 10/1979 | Takeuchi et al. | ............. | 165/126 |
| 4,424,996 A * | 1/1984 | Yoshiyuki | ............. | 293/117 |
| 4,566,407 A * | 1/1986 | Peter | ............. | 123/41.48 |
| 4,938,303 A * | 7/1990 | Schaal et al. | ............. | 180/68.1 |
| 5,046,550 A * | 9/1991 | Boll et al. | ............. | 165/41 |
| 5,887,672 A * | 3/1999 | Kimura | ............. | 180/68.1 |
| 6,390,217 B1 * | 5/2002 | O'Brien et al. | ............. | 180/68.6 |
| 6,405,819 B1 * | 6/2002 | Ohkura et al. | ............. | 180/68.1 |
| 7,451,844 B2 * | 11/2008 | Kunikata | ............. | 180/68.1 |
| 7,726,428 B2 * | 6/2010 | Kowalski | ............. | 180/68.6 |
| 2010/0243351 A1 * | 9/2010 | Sakai | ............. | 180/68.1 |

FOREIGN PATENT DOCUMENTS

JP  11-011163  1/1999

* cited by examiner

*Primary Examiner* — Frank Vanaman
(74) *Attorney, Agent, or Firm* — Smith, Gambrell & Russell, LLP

(57) ABSTRACT

A cooling air introduction apparatus for a vehicle. A space that communicates with air introduction ports that are respectively formed in a bumper face of a front bumper and a front grille is partitioned by a vertical partition member. A space that communicates with the air introduction ports that are formed in the bumper face is partitioned by a horizontal partition member. Thus, streams of introduced cooling air are guided to heat exchangers without interfering with each other. The partition members are provided such that a bumper beam moves backward without any trouble upon a light collision.

9 Claims, 11 Drawing Sheets

COOLING AIR INTRODUCTION APPARATUS FOR VEHICLE

CROSS-REFERENCE TO RELATED APPLICATIONS

The present application claims priority from Japanese Patent Application Nos. 2011-078292 and 2011-078293 filed on Mar. 31, 2011, the entire contents of which are hereby incorporated by reference.

BACKGROUND OF THE INVENTION

1. Field of the Invention

The present invention relates to a cooling air introduction apparatus for a vehicle that can efficiently introduce cooling air through an air hole formed in a front member to heat exchangers.

2. Description of the Related Art

As is well known, the front portion of a vehicle such as an automobile is provided with a front bumper, and a front grille is mounted above the front bumper. The front bumper has a bumper face that forms the outer surface of the front bumper, and a bumper beam disposed in the inner surface of the bumper face. The bumper face and the front grille have openings of a lower air introduction port and an upper air introduction port, respectively, and cooling air introduced from both of the air introduction ports is introduced into heat exchangers (such as a radiator for cooling an engine, a condenser for an air-conditioner) disposed in the front portion of the engine compartment and cooled by the heat exchangers.

The bumper beam disposed in the rear surface of the bumper face extends in the vehicle width direction. Between the bumper beam and the heat exchangers, a space is provided for securing at least a crush stroke at the time of a light head-on collision.

The rear surface portions on both sides of the bumper beam are fixed to the ends of front side frames disposed on the right and left sides of the vehicle in the width direction, and crash boxes are provided at the respective ends of the front side frames. When a head-on collision occurs, impact load is transmitted to the front side frames via the bumper beam, and the crash boxes are first axially crushed in a bellows manner so that part of the impact energy is absorbed. The space for a crush stroke between the bumper beam and the heat exchangers, and thus, even when the crash boxes are axially crushed and the bumper beam is forced backward at the time of a light collision, contact of the bumper beam with the heat exchangers can be avoided, thereby protecting the heat exchangers from being damaged.

However, because a space is provided between the bumper beam and the heat exchangers as described above, cooling air taken in through the lower air introduction port provided in the bumper face while the vehicle is running is moved upward in the space formed between the bumper beam and the heat exchangers, and interferes with the cooling air taken in through the upper air introduction port provided in the front grille so that a vortical turbulent flow is generated. The turbulent flow creates an air-flow resistance to the cooling air, and thus the cooling performance of the heat exchangers is reduced.

In order to cope with this problem, for example, Japanese Unexamined Patent Application Publication No. H11-11163 discloses a technology in which the space formed between the bumper and the heat exchangers is partitioned into upper and lower spaces by a plate-like control member (partition member) so as to introduce two streams of cooling air introduced through both of the air introduction ports of the front bumper and the front grille into the heat exchangers without the two streams of cooling air interfering with each other.

However, in the technology disclosed in Japanese Unexamined Patent Application Publication No. H11-11163, an rear end of the plate-like control member (partition member) is located close to the front of the heat exchangers, and thus when the bumper beam is forced backward at the time of a light head-on collision, the control member fixed to the bumper beam is forced back together, and the rear end of the control member comes into contact with a heat exchanger, which may be damaged.

SUMMARY OF THE INVENTION

In view of the above-described situations, the present invention aims to provide a cooling air introduction apparatus for a vehicle that can efficiently guide cooling air introduced from an air introduction port formed in a front member to a heat exchanger, as well as can prevent damage to the heat exchanger even when a partition member is forced backward at the time of a light collision, thereby effectively protecting the heat exchanger from being damaged.

A cooling air introduction apparatus for a vehicle according an aspect of the present invention includes: a frame for fixing a heat exchanger disposed in a front vehicle body portion; a bumper beam disposed in front of the frame with a predetermined space therebetween; air introduction ports that are formed above and below the bumper beam, respectively, and introduce cooling air; and a partition member for partitioning the space into upper and lower spaces. A rear end of the partition member is fixed to the frame, and a front end of the partition member overhangs either one of the top and the bottom of the bumper beam.

According to the present invention, the partition member is interposed between a heat exchanger and a front member, and thus two streams of cooling air introduced from the air introduction ports formed in the front member can be guided to the heat exchanger without interfering with each other, whereby the heat exchanger is not damaged.

DESCRIPTION OF THE PREFERRED EMBODIMENTS

Hereinafter, embodiments of the present invention will be described with reference to the accompanying drawings.

First Embodiment

Figure 1:
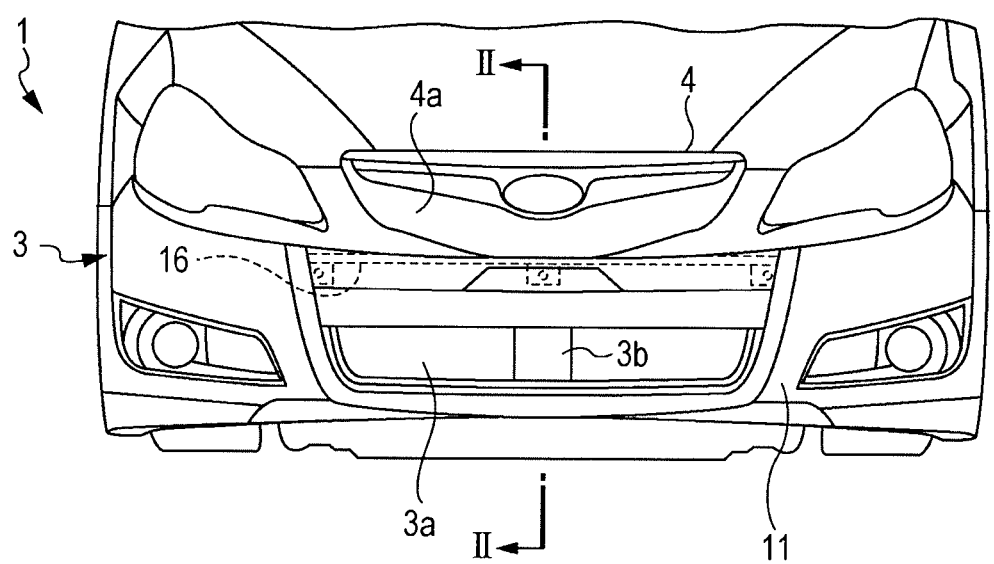
FIG. 1 is a front view of a main section of a vehicle according to a first embodiment.
Figure 2:
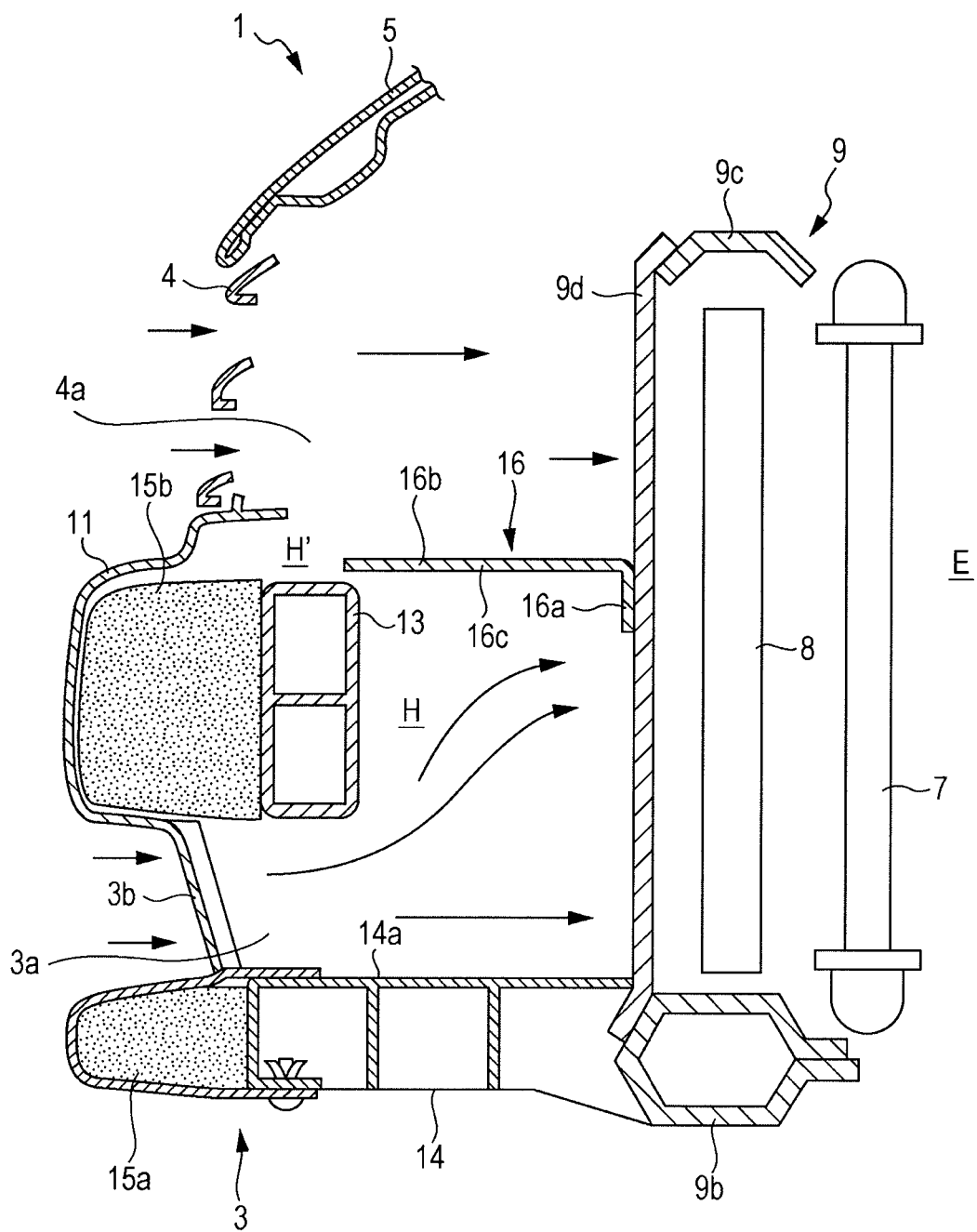
FIG. 2 is a cross-sectional view taken along a line II-II in FIG. 1.

As illustrated in FIGS. 1 and 2, a front portion 1 of an automobile as an example of a vehicle is provided with a bumper 3 at the front end thereof. A front grille 4 is disposed above the front bumper 3, and an engine compartment E is provided behind the front grille 4. In addition, a front hood 5 is disposed above the front portion 1 of the vehicle, and the front hood 5 openably/closably covers an upper portion of the engine compartment E. A power unit such as an engine (not shown) is mounted on the engine compartment E.

A heat exchanger (hereinafter referred to as a "radiator") 7 constituting a cooling system of the engine is disposed in a front portion of the engine compartment E. Further, a heat exchanger (hereinafter referred to as a "condenser") 8 constituting a refrigeration cycle of an air conditioner is disposed in front of the radiator 7.

The radiator 7 and condenser 8 are fixed to a radiator panel 9 (see FIGS. 2 and 3) serving as a frame. The radiator panel 9 includes a vertical frame 9a on each side in the vehicle width direction, a lower frame 9b below the vertical frames 9a, and an upper frame 9c above the vertical frames 9a, and thus forms a rectangular frame shape as viewed from the front. A stay 9d is disposed at the center of the radiator panel 9 in the car width direction connecting the lower frame 9b and the upper frame 9c. The vertical frames 9a are fixed to a pair of front side frames 12 that is disposed on the right and left sides in the vehicle width direction and extends in the front-rear direction of the vehicle.

The front bumper 3 has a bumper face 11 that serves as part of the structure of the front face of the vehicle body, and a bumper beam 13 that is disposed behind the rear face of the bumper face 11 and extends along the bumper face 11 in the vehicle width direction. The front faces of the front side frames 12 are fixed to both sides of the rear face of the bumper beam 13. In addition, a crash bracket 14 is disposed under the bumper beam 13.

Furthermore, a lower shock absorber 15a is interposed between the inner surface of the bumper face 11 and the crash bracket 14, and the rear face of the lower shock absorber 15a is affixed to the front end face of the crash bracket 14. An upper shock absorber 15b is interposed between the inner surface of the bumper face 11 and the bumper beam 13, and the rear face of the upper shock absorber 15b is affixed to the front face of the bumper beam 13. A lower air introduction port 3a is opened in the front bumper 3, and an upper air introduction port 4a is opened in the front grille 4. A vertical supporter 3b having a predetermined width is formed in the center of the lower air introduction port 3a in the vehicle width direction, and thus the lower air introduction port 3a is divided into right and left halves by the vertical supporter 3b.

The crash bracket 14 is formed in a box shape that fills a space between the lower portion of the bumper face 11 and the lower frame 9b of the radiator panel 9. An upper surface 14a of the crash bracket 14 is formed coplanar to the undersurface of the lower air introduction port 3a, and serves as a straightening vane for introducing cooling air.

Figure 3:
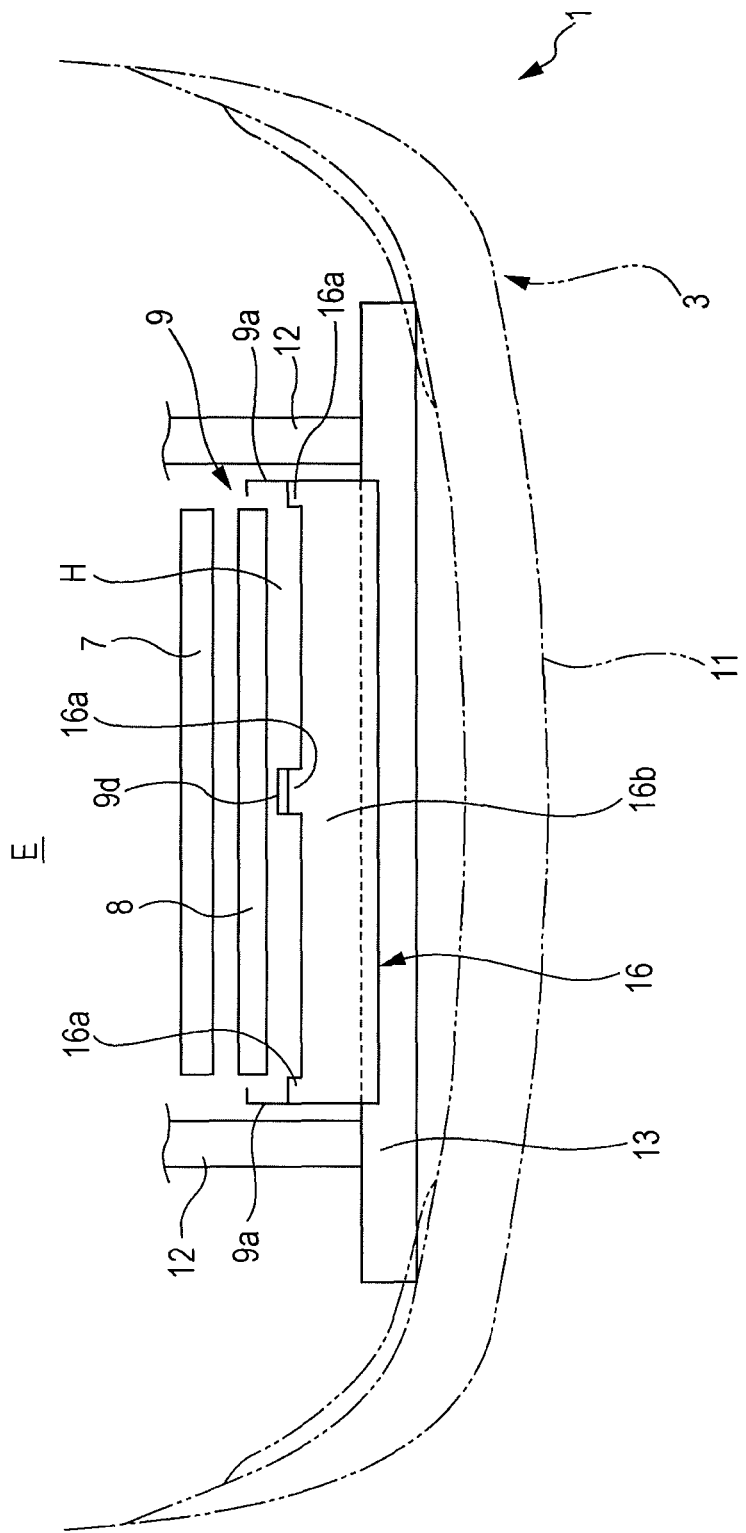
FIG. 3 is a plan view of a cooling air introduction apparatus.
Figure 4:
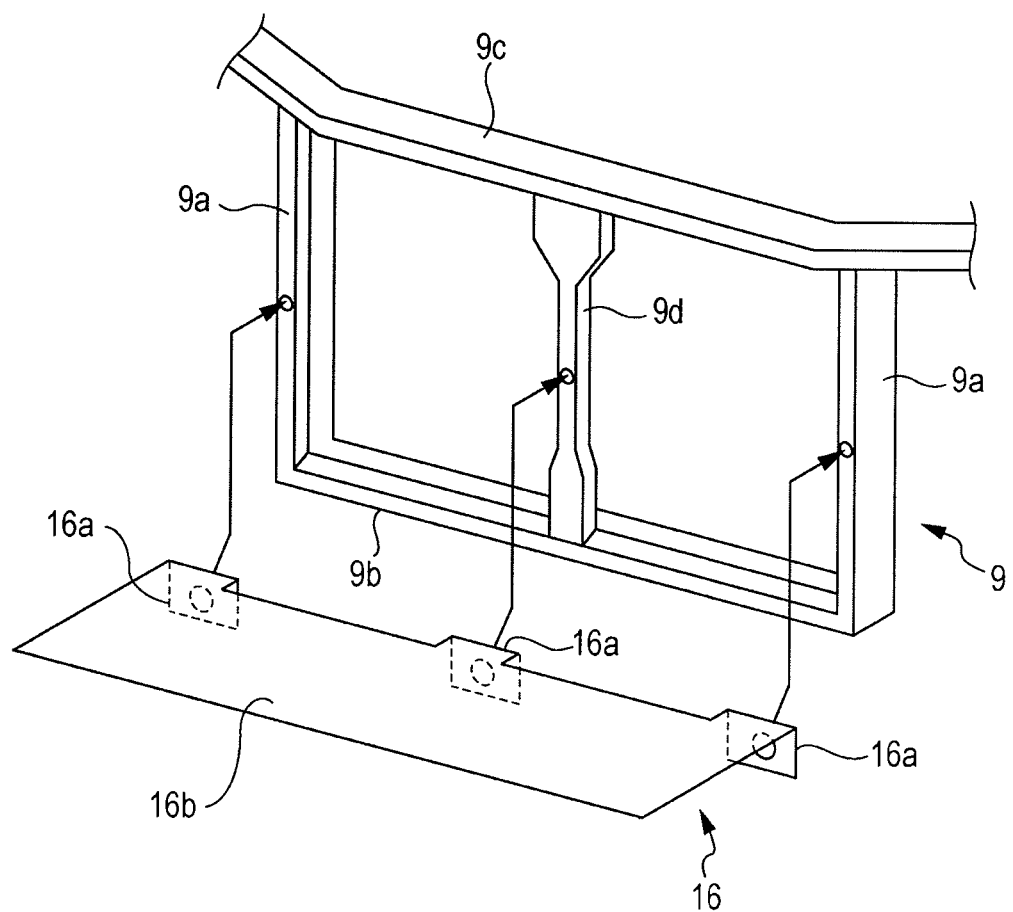
FIG. 4 is a perspective view of a radiator panel and a vertical partition member.

In addition, a space H for absorbing a crush stroke at the time of a light head-on collision is provided between the bumper beam 13 and the condenser 8, and a vertical partition member 16 is disposed horizontally in the space H. The vertical partition member 16 is made of a sheet metal or a resin. As illustrated in FIGS. 3 and 4, a tongue-shaped bearing surface 16a is formed by being bent at three positions in the rear of the vertical partition member 16. The bearing surfaces 16a are respectively mounted on the right and left vertical frames 9a and the stay 9d of the radiator panel 9, and the width of each bearing surface 16a are equal to or shorter than the respective widths of the corresponding vertical frames 9a and stay 9d of the radiator panel 9. Screw holes for mounting the bearing surfaces 16a are provided in the right and left vertical frames 9a and the stay 9d of the radiator panel 9. A bolt insertion hole is formed in each of the bearing surfaces 16a.

As illustrated in FIG. 2, in a state where the bearing surfaces 16a of the vertical partition member 16 are mounted on the radiator panel 9 at the predetermined positions, the front end of the vertical partition member 16 overhangs the top of the bumper beam 13, and thus the space H is partitioned into a lower air introduction port 3a side and an upper air introduction port 4a side. An upper surface 16b of the vertical partition member 16 is formed in a flat shape, and thus serves as a straightening vane for introducing cooling air introduced from the upper air introduction port 4a to the condenser 8.

Next, the process of the present embodiment with the above configuration is described. When a vehicle runs, cooling air from the front of the car is taken into the lower air introduction port 3a opened in the front bumper 3 and the upper air introduction port 4a opened in the front grille 4, and is introduced into the front portion 1 of the vehicle.

Since the space H which communicates with the lower air introduction port 3a and the upper air introduction port 4a is partitioned into upper and lower spaces by the vertical partition member 16 interposed between the bumper beam 13 and the condenser 8, and the upper surface 16b serves as a straightening vane, the cooling air introduced through the upper air introduction port 4a is introduced along the upper surface 16b of the vertical partition member 16 toward the condenser 8 and the radiator 7 which is disposed behind and faces the condenser 8.

On the other hand, part of the cooling air introduced through the lower air introduction port 3a is introduced along the upper surface 14a of the crash bracket 14, which is disposed in the undersurface of the lower air introduction port 3a, toward the condenser 8 and the radiator 7 which is disposed behind and faces the condenser 8. In addition, another part of the cooling air introduced through the lower air introduction port 3a is moved upward and introduced along the undersurface 16c of the vertical partition member 16 toward the condenser 8 and the radiator 7 which is disposed behind and faces the condenser 8.

At this moment, since, as illustrated in FIGS. 2 and 3, the front end of the vertical partition member 16 overhangs the top of the bumper beam 13, and the rear of the vertical partition member 16 is fixed to the radiator panel 9 so as to form separated upper and lower spaces, the cooling air flowing along the upper surface 16b of the vertical partition member 16, and the cooling air flowing along the lower surface 16c of the vertical partition member 16 do not interfere with each other, and thus are introduced toward the condenser 8 without generating a vortical turbulent flow. Consequently, it is possible to efficiently cool the condenser 8 and the radiator 7.

In addition, the vertical partition member 16 according to the present embodiment can be attached to the radiator panel 9 by forming a screw hole therein, and thus may be simply attached to any conventional vehicle, thereby achieving high versatility. Furthermore, since the bearing surfaces 16a of the vertical partition member 16 are formed only in areas that are in contact with the vertical frames 9a and the stay 9d of the radiator panel 9, and the widths of the bearing surfaces 16a are equal to or shorter than the respective widths of the corresponding vertical frames 9a and stay 9d of the radiator panel 9, the front of the condenser 8 is not blocked by the bearing surfaces 16a. Consequently, the disposition of the vertical partition member 16 in the space H does not generate a large air-flow resistance, and thus the cooling efficiency for the heat exchangers (the condenser 8 and the radiator 7) is not reduced.

Furthermore, the front end of the vertical partition member 16 overhangs the top of the bumper beam 13, and thus, even when the bumper beam 13 is forced backward due to a light collision, the vertical partition member 16 does not come into contact with the bumper beam 13. Therefore, the radiator panel 9 and the condenser 8 are not pressed by the vertical partition member 16. Consequently, it is possible to effectively protect the radiator panel 9, the condenser 8, and the radiator 7 from being damaged, thereby reducing repair cost.

As illustrated in FIG. 2, a space H' is formed between the front end of the vertical partition member 16 and the inner surface of the bumper face 11. In the case where a vortical turbulent flow occurs in the space H' when cooling air is introduced through the upper air introduction port 4a, the space H' may be filled by a foaming material such as urethane.

The present invention is not limited to the above-described embodiment and, for example, the vertical partition member 16 may be provided on the lower air introduction port 3a side so that the front end of the vertical partition member 16 overhangs the bottom of the bumper beam 13.

Second Embodiment

Figure 5:
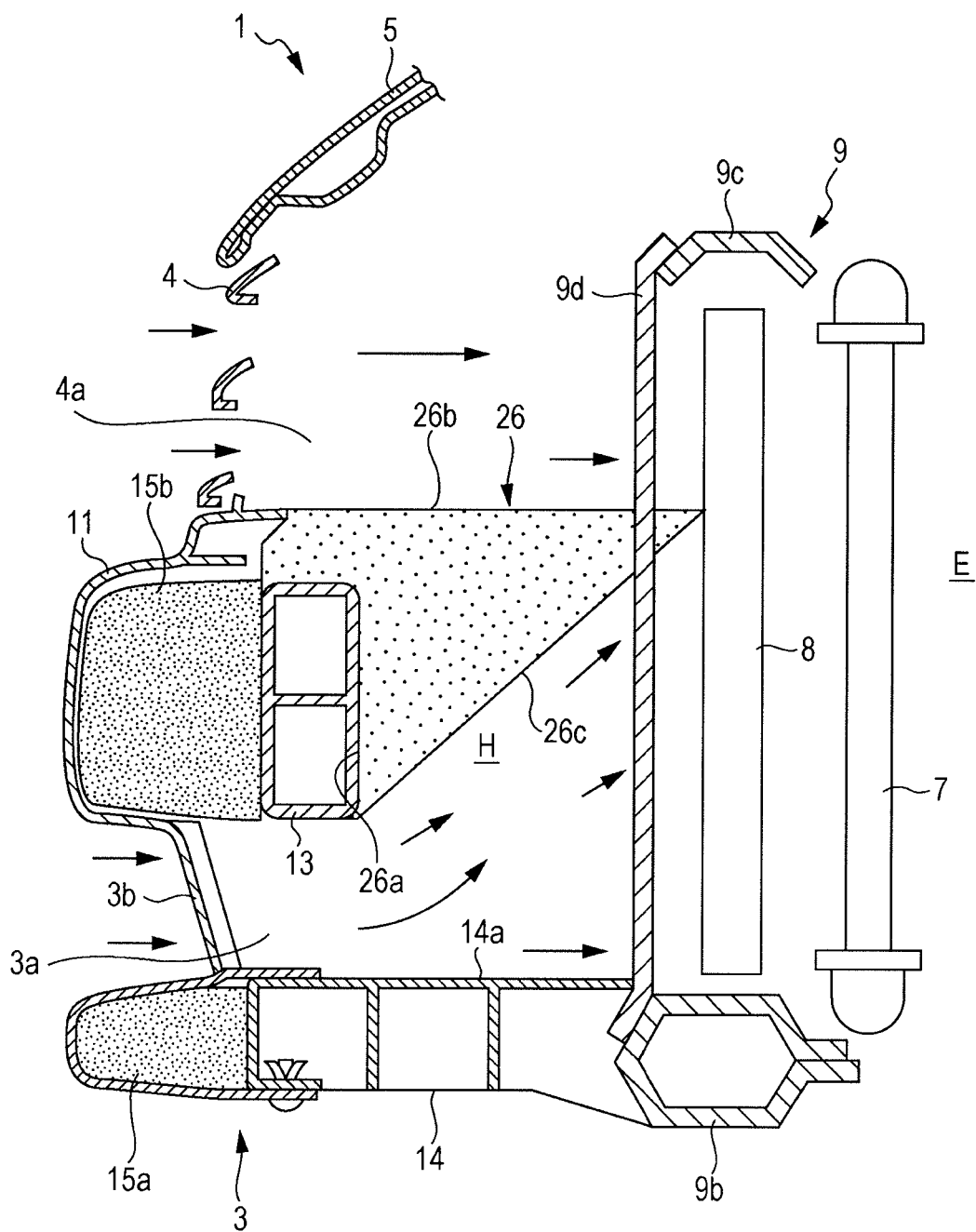
FIG. 5 is a cross-sectional view according to a second embodiment, the view corresponding to FIG. 2.
Figure 6:
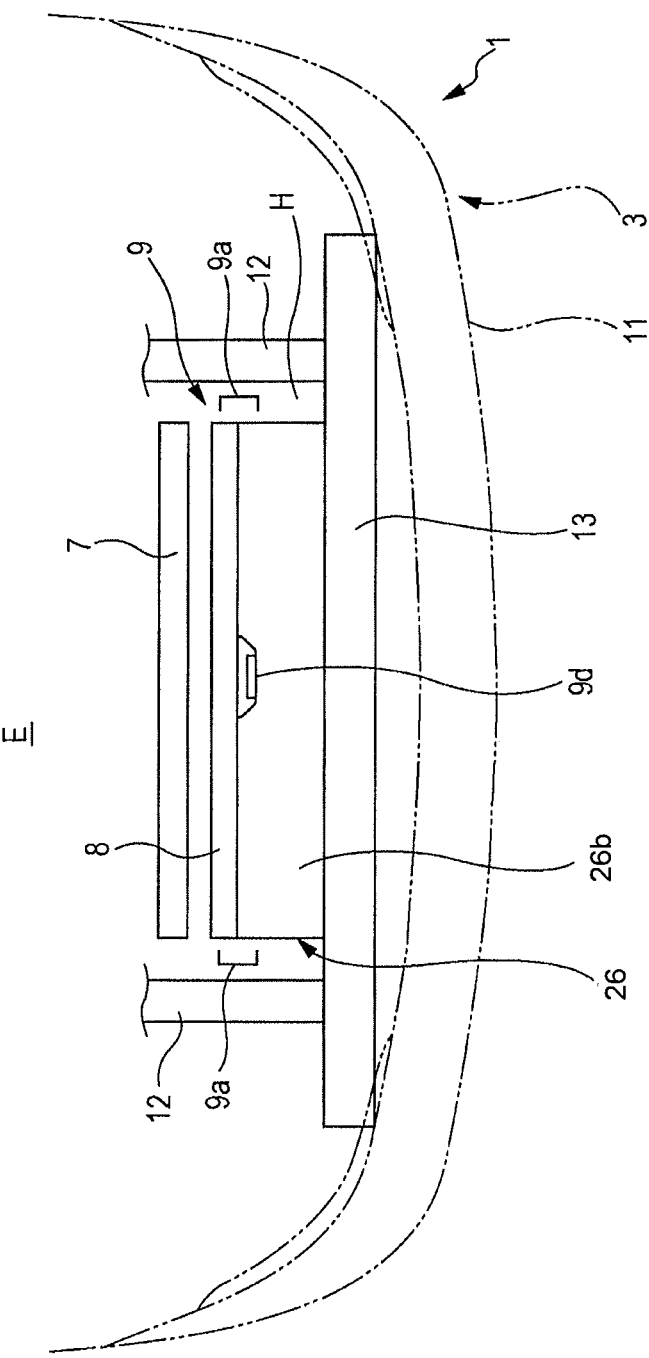
FIG. 6 is a plan view of a cooling air introduction apparatus according to the second embodiment.
Figure 7:
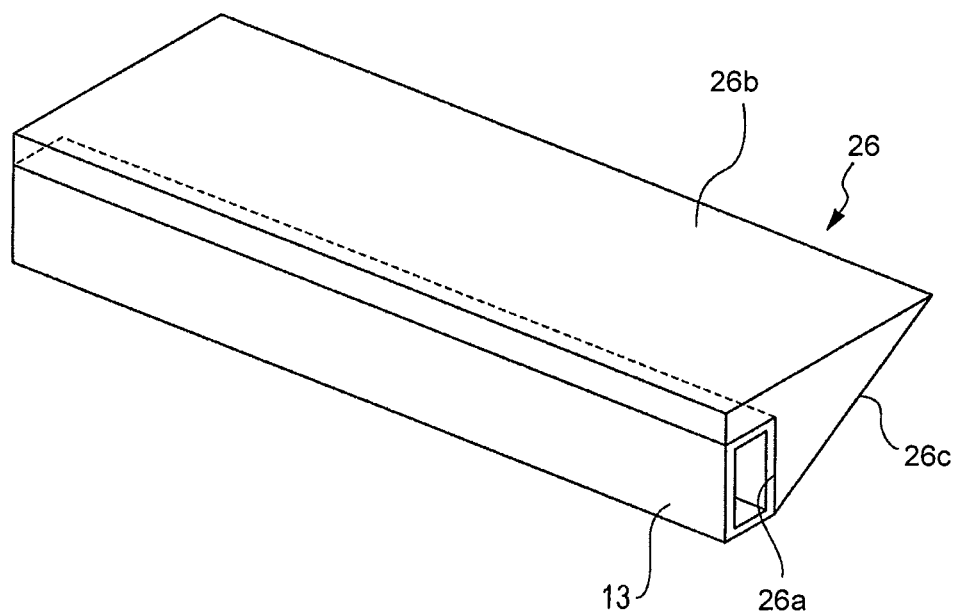
FIG. 7 is a perspective view of a vertical partition member according to the second embodiment.

A second embodiment of the present invention is illustrated in FIGS. 5, 6, and 7. The same components as those of the first embodiment are denoted with the same reference numerals, and description thereof is omitted. In the above-described first embodiment, the vertical partition member 16 separates cooling air introduced through the lower air introduction port 3a and cooling air introduced through the upper air introduction port 4a. In the present embodiment, on the other hand, a vertical partition member 26 is formed of a foaming material having a high foaming ratio including a material such as urethane, and is disposed horizontally at least across the width of the condenser 8 as illustrated in FIG. 6, and the width in the vertical direction as viewed from the side of the vehicle becomes shorter from the bumper beam 13 in the front of the vehicle to the condenser 8 in the rear as illustrated in FIG. 5. Accordingly, the front side on which the vertical partition member 26 is mounted and supported has a high rigidity, while the rear side which the condenser 8 is close to or is contact with has a low rigidity.

An upper surface 26b of the vertical partition member 26 is disposed continuously and substantially coplanar to the undersurface of the upper air introduction port 4a formed in the front grille 4, and the rear end of the upper surface 26b is disposed close to or in contact with the front surface of the condenser 8. Consequently, the space H which communicates with the lower air introduction port 3a and the upper air introduction port 4a which are vertically adjacent to each other is partitioned by the vertical partition member 26 into upper and lower spaces. As illustrated in FIG. 6, a region facing to the stay 9d provided in the radiator panel 9 at the rear end of the vertical partition member 26 is in contact with the stay 9d and is elastically deformed.

In addition, an undersurface 26c of the vertical partition member 26 that faces the lower air introduction port 3a forms an upwardly inclined surface from the front to the rear end of the vertical partition member 26. The front side of the undersurface 26c is disposed substantially at a same location as the upper surface of the lower air introduction port 3a, and the undersurface 26c intersects the upper surface 26b at the rear ends thereof with an acute angle, and thus the vertical partition member 26 has a substantially right triangular cross-sectional view. Therefore, the rear end of the vertical partition member 26 has a cross-sectional view in a sharp-pointed shape, and thus has a line contact with or a linear portion close to the condenser 8.

Next, the process of the present embodiment with the above configuration is described. When a vehicle runs, cooling air from the front of the vehicle is taken into the lower air introduction port 3a opened in the front bumper 3, and the upper air introduction port 4a opened in the front grille 4, and is introduced into the front portion 1 of the vehicle.

The space H which communicates with the lower air introduction port 3a and the upper air introduction port 4a is partitioned into the upper and lower spaces by the vertical partition member 26 interposed between the bumper beam 13 and the condenser 8. The upper surface 26b of the vertical partition member 26 is disposed substantially coplanar to the undersurface of the upper air introduction port 4a. Consequently, the cooling air introduced through the upper air introduction port 4a is introduced along the upper surface 26b of the vertical partition member 26, which serves as a straightening vane, toward the condenser 8 and the radiator 7 which is disposed behind and faces the condenser 8.

On the other hand, part of the cooling air introduced through the lower air introduction port 3a is introduced along the upper surface 14a of the crash bracket 14, which is disposed in the undersurface of the lower air introduction port 3a and serves as a straightening vane, toward the condenser 8 and the radiator 7 which is disposed behind and faces the condenser 8. In addition, another part of the cooling air introduced through the lower air introduction port 3a into the front portion 1 of the vehicle is moved upward and introduced upwardly along the inclined undersurface 26c of the vertical partition member 26 toward the condenser 8 and the radiator 7 which is disposed behind and faces the condenser 8.

At this moment, since, as illustrated in FIGS. 5 and 6, the rear end of the vertical partition member 26 is close to or in contact with the front surface of the condenser 8 so as to form separated upper and lower spaces, the cooling air flowing along the upper surface 26b of the vertical partition member 26, and the cooling air flowing along the lower surface 26c of the vertical partition member 26 do not interfere with each other, and thus are introduced toward the condenser 8 without generating a vortical turbulent flow due to interference. Consequently, the air-flow resistance is reduced, thereby efficiently cooling the capacitor 8 and the radiator 7.

In addition, the rear end of the vertical partition member 26 has a cross-sectional view in a sharp-pointed shape, and thus has a line contact with or a linear portion close to the condenser 8. Therefore, the vertical partition member 26 does not cover the front of the heat exchangers (the condenser 8 and the radiator 7), and thus the cooling efficiency is not significantly reduced.

Furthermore, the vertical partition member 26 is formed of a foaming material having a high foaming ratio, where the width of the foaming material in the vertical direction becomes shorter from the front of the vehicle to the rear thereof. Thus, even when the bumper beam 13 is forced backward due to a light collision and the rear end of the vertical partition member 26 is pressed against the surface of the condenser 8, the crush stroke is absorbed by elastic deformation of the vertical partition member 26, and thus the condenser 8 is not damaged, thereby reducing the repair cost.

In addition, in the present embodiment, a notch 26a is formed in the front of the vertical partition member 26, and is attached to the bumper beam 13 by affixing, and thus may be simply attached to any conventional vehicle, thereby achieving high versatility.

Third Embodiment

Figure 8:
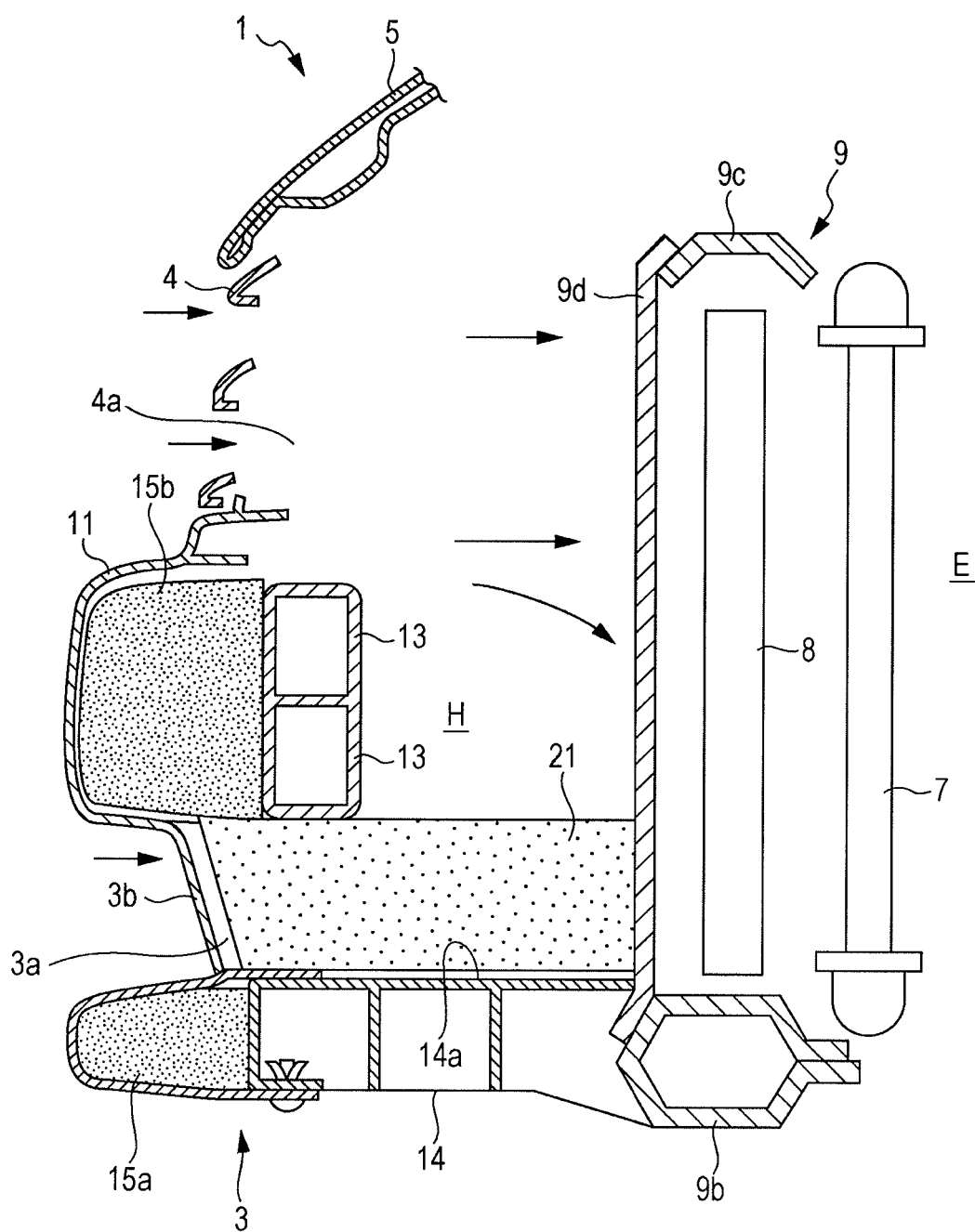
FIG. 8 is a cross-sectional view according to a third embodiment, the view corresponding to FIG. 2.
Figure 9:
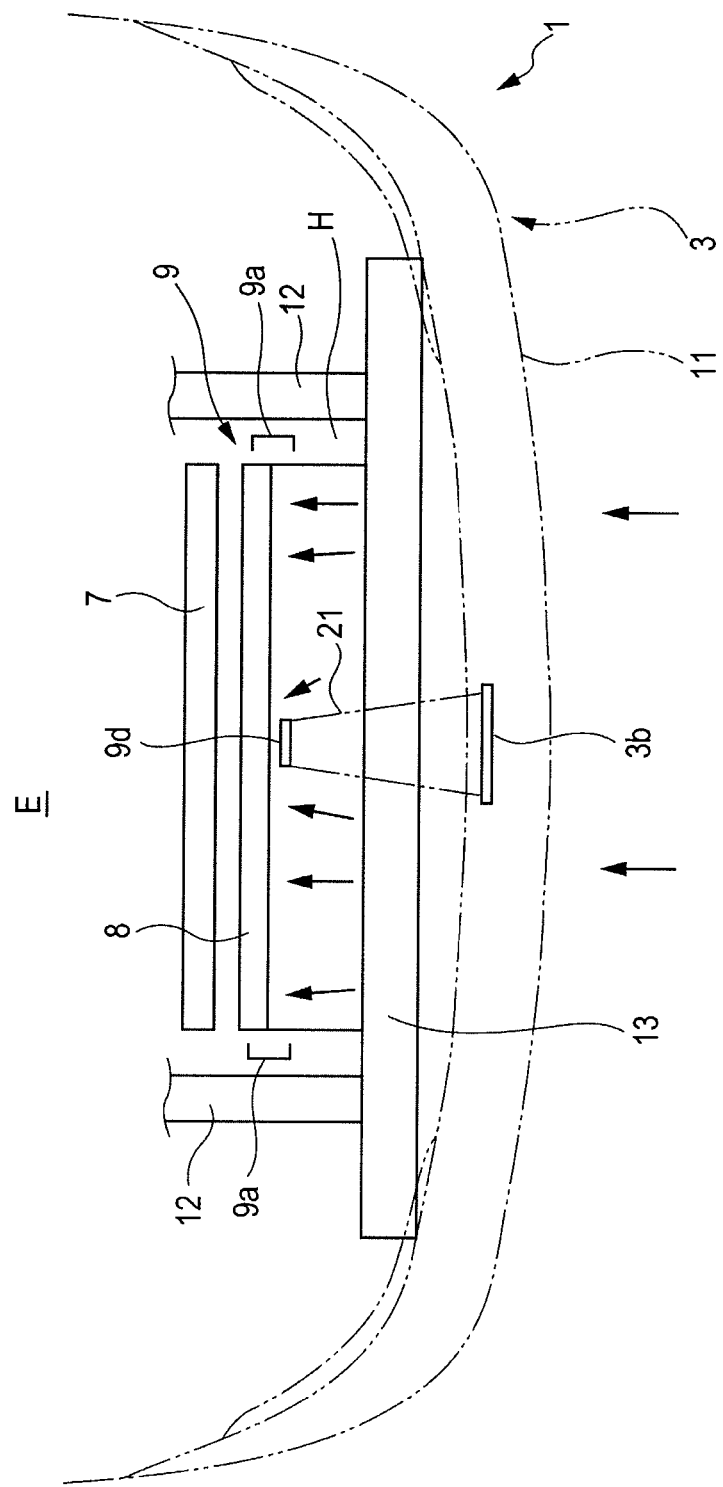
FIG. 9 is a plan view of a cooling air introduction apparatus according to the third embodiment.

A third embodiment of the present invention is illustrated in FIGS. 8 and 9. The same components as those of the first embodiment are denoted with the same reference numerals, and description thereof is omitted.

In the above-described second embodiment, the vertical partition member 26 separates the cooling air introduced through the lower air introduction port 3a and cooling air introduced through the upper air introduction port 4a. In the present embodiment, on the other hand, the space H between the rear surface of the vertical supporter 3b formed in the center of the lower air introduction port 3a, and the stay 9d of the radiator panel 9 which is disposed behind and faces the rear surface is partitioned by a horizontal partition member 21.

The lower air introduction port 3a is divided into right and left halves by the vertical supporter 3b in the center, and two streams of the cooling air introduced through the lower air introduction port 3a while the vehicle is running are taken in behind the vertical supporter 3b and interfere with each other, whereby a vortical turbulent flow is generated. In the present embodiment, however, the horizontal partition member 21 is interposed in the space H between the vertical supporter 3b and the stay 9d of the radiator panel 9 so that interference of the cooling air introduced through the lower air introduction port 3a is prevented, thereby preventing reduction in the cooling efficiency of the heat exchangers (the condenser 8 and the radiator 7).

Similarly to the vertical partition member 26 described above, the horizontal partition member 21 is formed of a foaming material having a high foaming ratio. As illustrated in FIGS. 8 and 9, the horizontal partition member 21 has a front surface having the substantially same width and height as those of the vertical supporter 3b, and has the rear end having the substantially same width as that of the stay 9d. At least one of the front and rear surfaces is affixed to the vertical supporter 3b or the stay 9d. In addition, the upper surface of the vertical partition member 26 is formed to be flat, and the undersurface thereof is formed in a shape according to that of the upper surface 14a of the crash bracket 14. Thus, when the width of the vertical supporter 3b is wider than that of the stay 9d as illustrated in FIG. 9, the horizontal partition member 21 has a plan view of a trapezoidal shape that becomes narrower in width from the front of the vehicle to the rear thereof.

In this configuration, the space H between the vertical supporter 3b and the radiator panel 9 is partitioned by the horizontal partition member 21, and thus two streams of the cooling air introduced through the lower air introduction port 3a, which has respective openings on the right and left of the vertical supporter 3b, are introduced along the lateral surfaces of the horizontal partition member 21 toward the condenser 8 without interfering with each other behind the vertical supporter 3b, thereby preventing reduction in the cooling efficiency.

Furthermore, the horizontal partition member 21 is formed of a foaming material having a high foaming ratio, and thus, even when the bumper beam 13 is forced backward due to a light collision and the rear end of the horizontal partition member 21 is pressed against the stay 9, the crush stroke is absorbed by elastic deformation of the horizontal partition member 21. Therefore the radiator panel 9 and the condenser 8 are not damaged, thereby reducing the repair cost. The space H between the bumper beam 13 and the stay 9d may be partitioned alternatively by projecting the upper surface of the horizontal partition member 21 upward.

Fourth Embodiment

Figure 10:
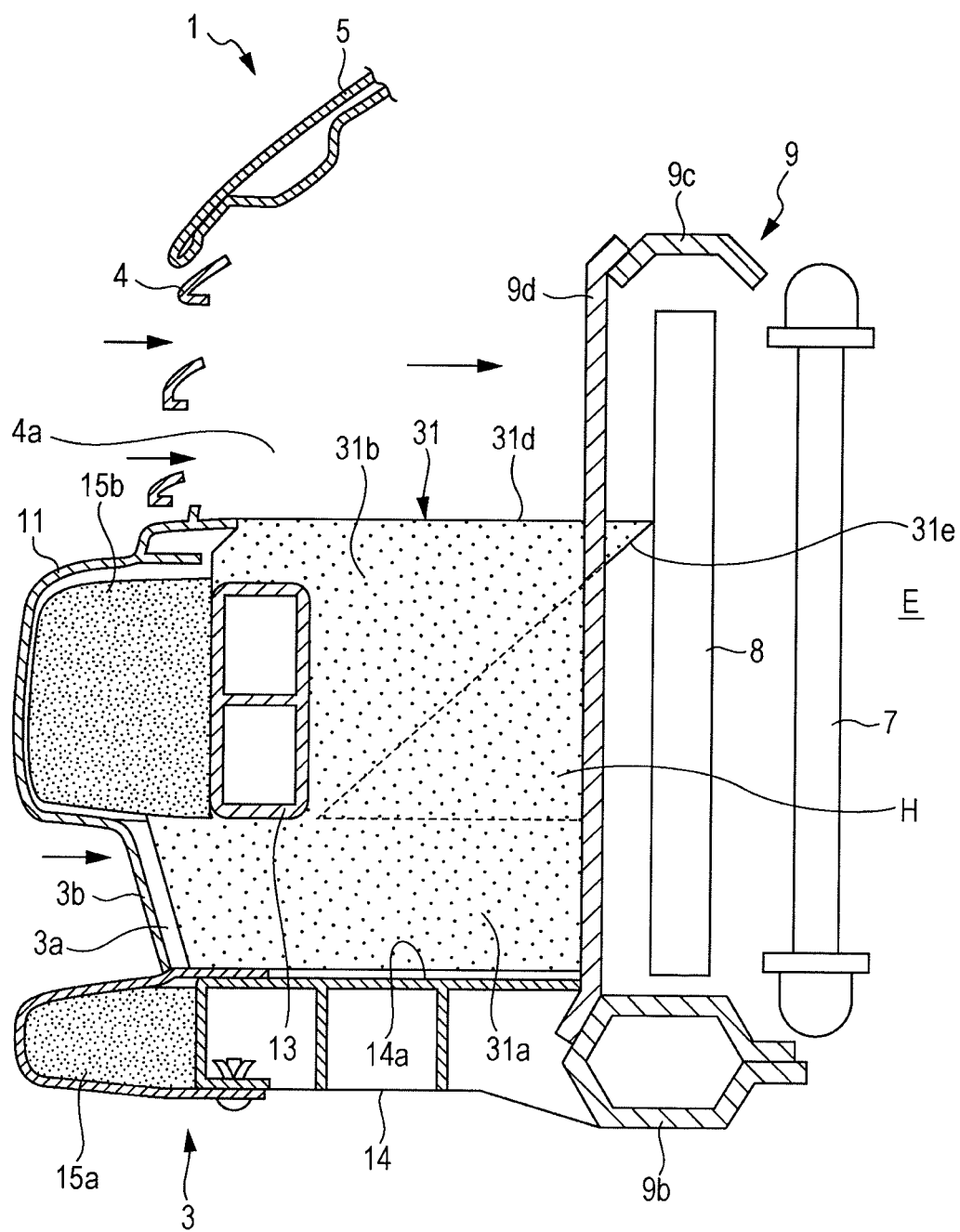
FIG. 10 is a cross-sectional view according to a fourth embodiment, the view corresponding to FIG. 2.
Figure 11A:
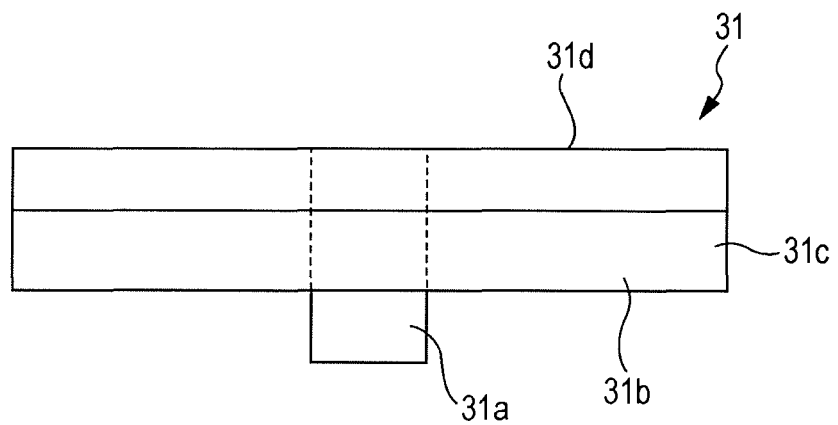
FIG. 11A is a front view of a partition member according to the fourth embodiment.
Figure 11B:
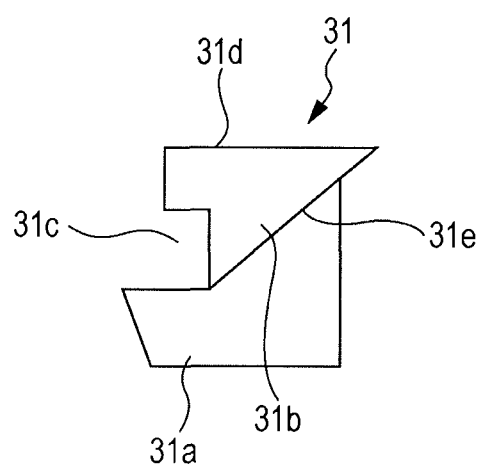
FIG. 11B is a right side view of the partition member according to the fourth embodiment.

A fourth embodiment of the present invention is illustrated in FIGS. 10 and 11. The same components as those of the first embodiment are denoted with the same reference numerals, and description thereof is omitted.

A partition member 31 according to the present embodiment is achieved by integrating the vertical partition member 26 in the second embodiment, and the horizontal partition member 21 in the third embodiment, and is formed of a foaming material having a high foaming ratio.

As illustrated in FIG. 11, a horizontal partition unit 31a is formed in the center of the partition member 31 in the width direction, and a vertical partition unit 31b is formed above the horizontal partition unit 31a, extending in the horizontal direction. The horizontal partition unit 31a is interposed between the rear surface of the vertical supporter 3b and the stay 9d of the radiator panel 9. The upper surface of the horizontal partition unit 31a projects upward and is connected to the vertical partition unit 31b.

In the front of this vertical partition unit 31b, there is formed a notch 31c that is affixed to the rear surface and the upper surface of the bumper beam 13. The upper surface 31d of the vertical partition unit 31b is formed flat, and the undersurface 31e forms an upwardly inclined surface from the front to the rear of the vertical partition unit 31b.

In this configuration, as illustrated in FIG. 10, when the partition member 31 is mounted on the space H provided between the bumper face 11 and the radiator panel 9, the space between the lower air introduction port 3a and the upper air introduction ports 4a is partitioned by the vertical partition unit 31b, and the lower air introduction port 3a divided into the right and left halves by the vertical supporter 3b is partitioned by the horizontal partition unit 31a.

Consequently, part of two streams of cooling air introduced into the lower air introduction port 3a through the right and left halves respectively is guided toward the condenser 8 along the lateral surfaces of the horizontal partition unit 31a in the center without interfering with each other. Cooling air introduced into the lower air introduction port 3a is moved upward, and is guided toward the condenser 8 along the inclined surface formed on the undersurface 31e of the vertical partition unit 31b. On the other hand, the cooling air introduced from the upper air introduction port 4a is guided toward the condenser 8 along the flat upper surface 31d of the vertical partition unit 31b.

Since the rear end of the vertical partition unit 31b has a cross-sectional view in a sharp-pointed shape, and is close to or in contact with the front surface of the condenser 8, two streams of cooling air introduced through the lower air introduction port 3a and the upper air introduction port 4a are guided toward the condenser 8 without interfering with each other.

As described above, in the present embodiment, the space between the vertical supporter 3b and the stay 9d of the radiator panel 9 is partitioned by the horizontal partition unit 31a, and the space between the bumper beam 13 and the stay 9d is partitioned by the vertical partition unit 31b, and thus two streams of cooling air introduced through the lower air introduction port 3a and the upper air introduction port 4a are guided toward the condenser 8 without interfering with each other. Consequently, it is possible to prevent reduction in the cooling efficiency of the heat exchangers (the condenser 8 and the radiator 7).

Furthermore, the partition member 31 is formed of a foaming material having a high foaming ratio, and thus, even when the bumper beam 13 is forced backward due to a light collision and the rear end of the partition member 31 is pressed against the surface of the condenser 8, the crush stroke is absorbed by elastic deformation of the partition member 31. Therefore, the radiator panel 9 and the condenser 8 are not damaged, thereby reducing the repair cost.

The present invention is not limited to the above-described embodiments. For example, in a vehicle that is not equipped with the condenser 8 for an air conditioner, the rear ends of the vertical partition member 16 and the vertical partition unit 31b of the partition member 31 are close to or in contact with the surface of the radiator 7. The foaming material may be a foamed rubber.

In the above-described fourth embodiment, the horizontal partition unit 31a and the vertical partition unit 31b are integrally formed in the partition member 31. However, either one of the vertical partition member 16 in the first embodiment and the vertical partition member 26 in the second embodiment, and the horizontal partition member 21 in the third embodiment may be separately interposed in a single space H.

What is claimed is:

1. A cooling air introduction apparatus for a vehicle comprising:
   a heat exchanger disposed in a front portion of a vehicle;
   a front member disposed in front of the heat exchanger with a predetermined space therebetween; and
   a plurality of air introduction ports that are formed in the front member and are configured to take in cooling air,
   wherein a partition member is disposed between the air introduction ports, and is located between the heat exchanger and the front member,
   wherein the front member includes a front bumper and a front grille provided above the front bumper,
   wherein the air introduction ports are formed in the front member at locations above and below a bumper beam,
   wherein the partition member is provided between a frame for fixing the heat exchanger disposed in the front portion of the vehicle and the bumper beam disposed in front of the frame such that a rear end of the partition member is fixed to the frame and a front end of the partition member overhangs either one of a top portion and a bottom portion of the bumper beam so as to partition the predetermined space into upper and lower spaces that are both operable as passageways to deliver cooling air from the air introduction ports to the heat exchanger, and wherein the partition member is attached to the frame by a bearing surface, the bearing surface having a width that is equal to or shorter than a width of the frame.

2. The cooling air introduction apparatus for a vehicle according to claim 1, wherein the air introduction ports include an air introduction port that is divided into right and left halves via a vertical supporter, and a horizontal partition member is interposed in a space behind a rear surface of the vertical supporter, the horizontal partition member being integrally formed with the partition member.

3. The cooling air introduction apparatus for a vehicle according to claim 1, wherein the partition member is free of contact with the front member and free of contact with the bumper beam.

4. The cooling air introduction apparatus for a vehicle according to claim 1, wherein the front end of the partition member is a free end.

5. A cooling air introduction apparatus for a vehicle comprising:
   a heat exchanger disposed in a front portion of a vehicle;
   a front member disposed in front of the heat exchanger with a predetermined space therebetween; and
   a plurality of air introduction ports that are formed in the front member and are configured to take in cooling air,
   wherein a partition member is disposed between the air introduction ports which are adjacent, and is located between the heat exchanger and the front member;
   wherein the front member is a front bumper;
   the air introduction ports include an air introduction port that is divided into right and left halves via a vertical supporter;
   the partition member is formed of a foaming material; and
   the partition member is interposed in a space behind a rear surface of the vertical supporter; and
   wherein the partition member is formed in such a manner that a width of the partition member becomes narrower from a vehicle front to a vehicle rear.

6. The cooling air introduction apparatus for a vehicle according to claim 5, further comprising a horizontal partition member that is interposed in a space behind a rear surface of the vertical supporter, the horizontal partition member being integrally formed with the partition member.

7. The cooling air introduction apparatus for a vehicle according to claim 5, wherein the width of the partition member that becomes narrower from the vehicle front to the vehicle rear is a width in the vertical direction.

8. A cooling air introduction apparatus for a vehicle comprising:
   a heat exchanger disposed in a front portion of a vehicle;
   a front member disposed in front of the heat exchanger with a predetermined space therebetween; and
   a plurality of air introduction ports that are formed in the front member and are configured to take in cooling air,
   wherein a partition member is disposed between the air introduction ports, and is located between the heat exchanger and the front member,
   wherein the front member includes a front bumper and a front grille provided above the front bumper,
   wherein the air introduction ports are formed in the front member at locations above and below a bumper beam,
   wherein the partition member is provided between a frame for fixing the heat exchanger disposed in the front portion of the vehicle and the bumper beam disposed in front of the frame such that a rear end of the partition member is fixed to the frame and a front end of the partition member overhangs either one of a top portion and a bottom portion of the bumper beam so as to partition the predetermined space into upper and lower spaces that are both operable as passageways to deliver cooling air from the air introduction ports to the heat exchanger, and
   wherein the air introduction ports include an air introduction port that is divided into right and left halves via a vertical supporter, and a horizontal partition member is interposed in a space behind a rear surface of the vertical supporter, the horizontal partition member being integrally formed with the partition member.

9. A cooling air introduction apparatus for a vehicle comprising:
a heat exchanger disposed in a front portion of a vehicle;
a front member disposed in front of the heat exchanger with a predetermined space therebetween; and
a plurality of air introduction ports that are formed in the front member and are configured to take in cooling air,
wherein a partition member is disposed between the air introduction ports which are adjacent, and is located between the heat exchanger and the front member;
wherein the front member includes a front bumper with a bumper beam and a front grille provided above the front bumper;
the partition member is formed of a foaming material; and
an upper surface of the partition member is formed horizontal rearward from an upper surface of the bumper beam, and
a lower surface of the partition member defines an upwardly inclined surface that extends away from the bumper beam toward the heat exchanger;
wherein the air introduction ports include an air introduction port that is divided into right and left halves via a vertical supporter, and a horizontal partition member is interposed in a space behind a rear surface of the vertical supporter, the horizontal partition member being integrally formed with the partition member.

* * * * *